(12) United States Patent
Dierksmeier et al.

(10) Patent No.: US 9,458,855 B2
(45) Date of Patent: Oct. 4, 2016

(54) COMPRESSOR TIP CLEARANCE CONTROL AND GAS TURBINE ENGINE

(75) Inventors: Douglas David Dierksmeier, Franklin, IN (US); Steven Lester Grant, Zionsville, IN (US); James Christopher Muskat, Mooresville, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 1078 days.

(21) Appl. No.: 13/334,607

(22) Filed: Dec. 22, 2011

(65) Prior Publication Data

US 2012/0167588 A1 Jul. 5, 2012

Related U.S. Application Data

(60) Provisional application No. 61/428,803, filed on Dec. 30, 2010.

(51) Int. Cl.
| | | |
|---|---|---|
| *F04D 29/58* | (2006.01) | |
| *F01D 25/14* | (2006.01) | |
| *F02C 6/08* | (2006.01) | |
| *F04D 29/16* | (2006.01) | |
| *F01D 11/24* | (2006.01) | |
| *F01D 11/14* | (2006.01) | |
| *F01D 11/20* | (2006.01) | |

(52) U.S. Cl.
CPC .......... *F04D 29/164* (2013.01); *F01D 11/24* (2013.01); *F01D 11/14* (2013.01); *F01D 11/20* (2013.01); *F01D 25/14* (2013.01); *F02C 6/08* (2013.01); *F05D 2240/11* (2013.01); *F05D 2260/201* (2013.01); *Y02T 50/676* (2013.01)

(58) Field of Classification Search
CPC ........ F01D 11/14; F01D 11/20; F01D 11/24; F01D 25/12; F01D 25/14; F04D 29/164; F04D 29/582; F04D 29/5826; F04D 29/584; F04D 29/5846; F05D 2260/201; F05D 2240/11; Y02T 50/676; F02C 6/08
USPC ............... 60/785, 795; 415/416, 115, 173.2, 415/175–178
See application file for complete search history.

(56) References Cited

U.S. PATENT DOCUMENTS

| | | | | |
|---|---|---|---|---|
| 2,837,270 A | * | 6/1958 | Chapman | ............ F04D 27/0215 415/145 |
| 3,279,751 A | * | 10/1966 | Ortolano | ................. F01D 5/225 416/191 |
| 4,242,042 A | * | 12/1980 | Schwarz | ................. F01D 11/24 415/116 |

(Continued)

*Primary Examiner* — Gerald L Sung
*Assistant Examiner* — Eric Linderman
(74) *Attorney, Agent, or Firm* — McCracken & Gillen LLC

(57) ABSTRACT

A unique compressor includes a rotating compressor blade having a blade tip; a compressor case having a blade track disposed opposite the blade tip; and a tip clearance control system including a fluid impingement structure. This structure has a plurality of openings to impinge a fluid received from a diffuser onto the compressor case. The tip clearance control system is configured to control a clearance between the blade tip and the blade track by impinging the fluid onto the compressor case and modulating the same with a valve in fluid communication with the diffuser. A further form includes a unique gas turbine engine having a compressor with a compressor blade tip, a compressor case disposed opposite the blade tip, and a fluid impingement structure having openings to impinge a fluid onto the case. Also included are other apparatuses, systems, devices, hardware, methods, and combinations for compressor blade tip clearance control.

14 Claims, 2 Drawing Sheets

(56) References Cited

U.S. PATENT DOCUMENTS

| | | | | |
|---|---|---|---|---|
| 4,329,114 A * | 5/1982 | Johnston | F01D 11/24 | 415/116 |
| 4,338,061 A * | 7/1982 | Beitler | F01D 11/24 | 415/1 |
| 4,472,108 A * | 9/1984 | Pask | F01D 11/22 | 415/113 |
| 4,576,547 A * | 3/1986 | Weiner | F01D 11/24 | 415/116 |
| 4,621,520 A * | 11/1986 | Schwarz | G01M 3/26 | 415/118 |
| 4,683,716 A * | 8/1987 | Wright | F01D 11/22 | 415/127 |
| 4,711,084 A * | 12/1987 | Brockett | | 60/785 |
| 4,719,747 A * | 1/1988 | Willkop | F01D 5/066 | 415/115 |
| 4,893,983 A * | 1/1990 | McGreehan | F01D 11/24 | 415/116 |
| 4,893,984 A * | 1/1990 | Davison | F01D 11/24 | 415/116 |
| 5,048,288 A * | 9/1991 | Bessette et al. | | 60/226.1 |
| 5,127,794 A * | 7/1992 | Burge | F01D 11/18 | 415/173.3 |
| 5,165,847 A * | 11/1992 | Proctor et al. | | 415/115 |
| 5,169,287 A * | 12/1992 | Proctor et al. | | 415/115 |
| 5,212,940 A * | 5/1993 | Glover | F01D 11/20 | 415/115 |
| 5,544,873 A * | 8/1996 | Vickers | B23B 1/00 | 269/47 |
| 5,607,284 A * | 3/1997 | Byrne | F01D 11/08 | 415/173.4 |
| 5,611,197 A * | 3/1997 | Bunker | | 60/806 |
| 5,993,150 A * | 11/1999 | Liotta et al. | | 415/115 |
| 6,146,091 A * | 11/2000 | Watanabe et al. | | 415/115 |
| 7,293,953 B2 | 11/2007 | Leach et al. | | |
| 7,596,954 B2 * | 10/2009 | Penda | F01D 11/16 | 415/173.2 |
| 7,785,063 B2 * | 8/2010 | McQuiggan | F01D 11/04 | 415/1 |
| 8,152,457 B2 * | 4/2012 | Flanagan | F01D 11/24 | 415/173.1 |
| 8,240,975 B1 * | 8/2012 | Ryznic | | 415/1 |
| 2002/0098079 A1 * | 7/2002 | Fujikawa et al. | | 415/116 |
| 2002/0172590 A1 * | 11/2002 | Sreekanth | F01D 5/187 | 415/115 |
| 2004/0047725 A1 * | 3/2004 | Tomita et al. | | 415/116 |
| 2004/0223846 A1 * | 11/2004 | Taylor | F01D 11/14 | 415/200 |
| 2005/0050901 A1 * | 3/2005 | Little | | 60/785 |
| 2005/0109016 A1 | 5/2005 | Ullyott | | |
| 2005/0111965 A1 * | 5/2005 | Lowe et al. | | 415/116 |
| 2005/0141989 A1 * | 6/2005 | Sayegh et al. | | 415/116 |
| 2006/0225430 A1 * | 10/2006 | Paprotna et al. | | 60/782 |
| 2007/0140839 A1 | 6/2007 | Bucaro et al. | | |
| 2007/0234737 A1 * | 10/2007 | Vosberg | | 60/785 |
| 2008/0089775 A1 * | 4/2008 | Lee | F01D 11/20 | 415/13 |
| 2008/0112798 A1 * | 5/2008 | Seitzer | F01D 11/24 | 415/144 |
| 2008/0131270 A1 * | 6/2008 | Paprotna | F01D 11/20 | 415/173.2 |
| 2008/0187435 A1 | 8/2008 | Farah et al. | | |
| 2008/0206039 A1 * | 8/2008 | Kane | F01D 11/20 | 415/1 |
| 2008/0226441 A1 | 9/2008 | Haselbach et al. | | |
| 2008/0267769 A1 * | 10/2008 | Schwarz | F01D 11/20 | 415/148 |
| 2008/0273968 A1 | 11/2008 | Vedhagiri et al. | | |
| 2009/0035125 A1 | 2/2009 | Fujimoto et al. | | |
| 2009/0044543 A1 * | 2/2009 | Clemen et al. | | 60/785 |
| 2009/0285671 A1 * | 11/2009 | Liang | | 415/116 |
| 2010/0000222 A1 * | 1/2010 | Price et al. | | 60/773 |
| 2010/0189551 A1 * | 7/2010 | Ballard et al. | | 415/175 |
| 2010/0196137 A1 * | 8/2010 | Horn | F01D 11/24 | 415/1 |
| 2010/0213929 A1 * | 8/2010 | Gregg | F01D 11/20 | 324/207.15 |
| 2010/0232929 A1 * | 9/2010 | Joe et al. | | 415/1 |
| 2010/0284795 A1 * | 11/2010 | Wadia | F01D 11/20 | 415/173.1 |

\* cited by examiner

COMPRESSOR TIP CLEARANCE CONTROL AND GAS TURBINE ENGINE

CROSS REFERENCE TO RELATED APPLICATIONS

The present application claims benefit of U.S. Provisional Patent Application No. 61/428,803, filed Dec. 30, 2010, entitled COMPRESSOR TIP CLEARANCE CONTROL AND GAS TURBINE ENGINE, which is incorporated herein by reference.

FIELD OF THE INVENTION

The present invention relates to gas turbine engines and compressors, and more particularly, to compressor blade tip clearance control.

BACKGROUND

Blade tip clearance control for compressors and gas turbine engine compressors remain an area of interest. Some existing systems have various shortcomings, drawbacks, and disadvantages relative to certain applications. Accordingly, there remains a need for further contributions in this area of technology.

SUMMARY

One embodiment of the present invention is a unique compressor. Another embodiment of the present invention is a unique gas turbine engine. Other embodiments include apparatuses, systems, devices, hardware, methods, and combinations for blade tip clearance control for compressors and gas turbine engine compressors. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
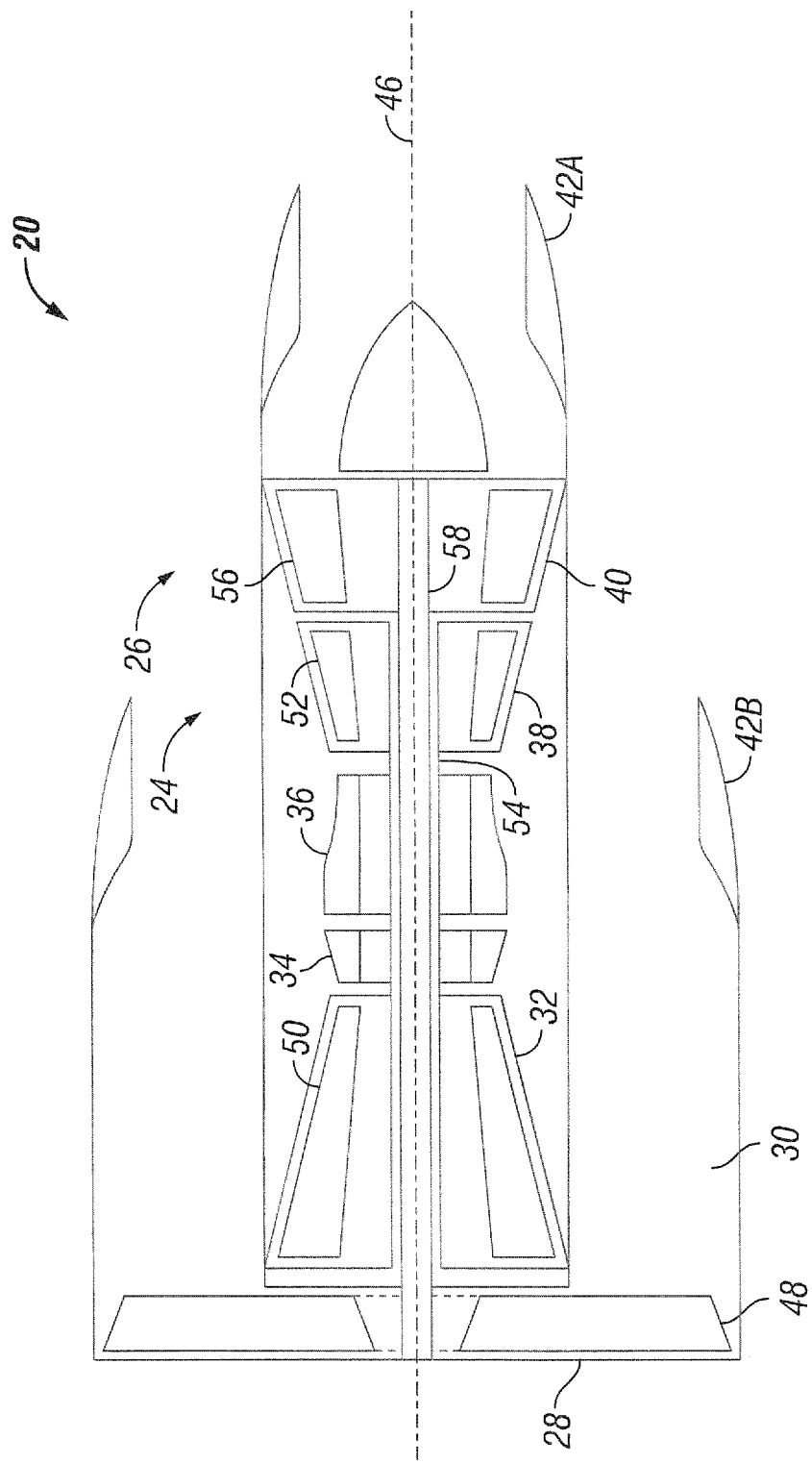
FIG. 1 schematically illustrates some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there are illustrated some aspects of a non-limiting example of gas turbine engine 20 in accordance with an embodiment of the present invention. In one form, engine 20 is a two spool engine having a high pressure spool 24 and a low pressure spool 26. In other embodiments, engine 20 may include three or more spools, or may include only a single spool. In one form, engine 20 is a turbofan engine, wherein low pressure spool 26 powers a propulsor 28 in the form of a turbofan (fan), referred to herein as a turbofan or a fan. In other embodiments, engine 20 may be a turboprop engine, wherein low pressure spool 26 powers a propulsor 28 in the form of a propeller system (not shown), e.g., via a reduction gearbox (not shown). In still other embodiments, engine 20 may be a marine and/or industrial gas turbine engine, e.g., for providing marine and/or land propulsion, power generation, fluid pumping and/or other work.

In one form, engine 20 includes, in addition to fan 28, a bypass duct 30, a compressor 32, a diffuser 34, a combustor 36, a high pressure (HP) turbine 38, a low pressure (LP) turbine 40, a nozzle 42A, and a nozzle 42B. In other embodiments, there may be, for example, an intermediate pressure spool having an intermediate pressure turbine.

Bypass duct 30 is in fluid communication with nozzle 42B. Diffuser 34 is in fluid communication with compressor 32. Combustor 36 is fluidly disposed between compressor 32 and turbine 38. In one form, combustor 36 includes a combustion liner (not shown) that contains a continuous combustion process. In other embodiments, combustor 36 may take other forms, and may be, for example, a wave rotor combustion system, a rotary valve combustion system, and/or a slinger combustion system, and may employ deflagration and/or detonation combustion processes. Turbine 40 is fluidly disposed between turbine 38 and nozzle 42B. In the depicted embodiment, engine 20 core flow is discharged through nozzle 42A, and the bypass flow is discharged through nozzle 42B. In other embodiments, other nozzle arrangements may be employed, e.g., a common nozzle for core and bypass flow; a nozzle for core flow, but no nozzle for bypass flow; or another nozzle arrangement. Bypass duct 30 and compressor 32 are in fluid communication with fan 28.

Fan 28 includes a fan rotor system 48. In various embodiments, fan rotor system 48 includes one or more rotors (not shown) that are powered by turbine 40. Fan 28 may include one or more vanes (not shown). Bypass duct 30 is operative to transmit a bypass flow generated by fan 28 around the core of engine 20. Compressor 32 includes a compressor rotor system 50. In various embodiments, compressor rotor system 50 includes one or more rotors (not shown) that are powered by turbine 38. Turbine 38 includes a turbine rotor system 52. In various embodiments, turbine rotor system 52 includes one or more rotors (not shown) operative to drive compressor rotor system 50. Turbine rotor system 52 is drivingly coupled to compressor rotor system 50 via a shafting system 54. Turbine 40 includes a turbine rotor system 56. In various embodiments, turbine rotor system 56 includes one or more rotors (not shown) operative to drive fan rotor system 48. Turbine rotor system 56 is drivingly coupled to fan rotor system 48 via a shafting system 58. In various embodiments, shafting systems 54 and 58 include a plurality of shafts that may rotate at the same or different speeds and directions. In some embodiments, only a single shaft may be employed in one or both of shafting systems 54 and 58. In one form, rotor systems 48, 50, 52 and 56, and shafting systems 54 and 58 rotate about an engine centerline 46. Turbine 40 is operative to discharge an engine 20 core flow to nozzle 42A.

During normal operation of gas turbine engine 20, air is drawn into the inlet of fan 28 and pressurized by fan rotor system 48. Some of the air pressurized by fan rotor system 48 is directed into compressor 32 as core flow, and some of the pressurized air is directed into bypass duct 30 as bypass flow. Compressor 32 further pressurizes the portion of the air received therein from fan 28, which is then discharged into diffuser 34. Diffuser 34 reduces the velocity of the pressurized air, and directs the diffused core airflow into combustor 36. Fuel is mixed with the pressurized air in combustor 36, which is then combusted. The hot gases exiting combustor 36 are directed into turbines 38 and 40, which extract energy in the form of mechanical shaft power to drive compressor 32 and fan 28 via respective shafting systems 54 and 58. In addition, in some embodiments, such as in turbofan, propjet or jet configurations, turbine 40 generates a thrust output.

Figure 2:
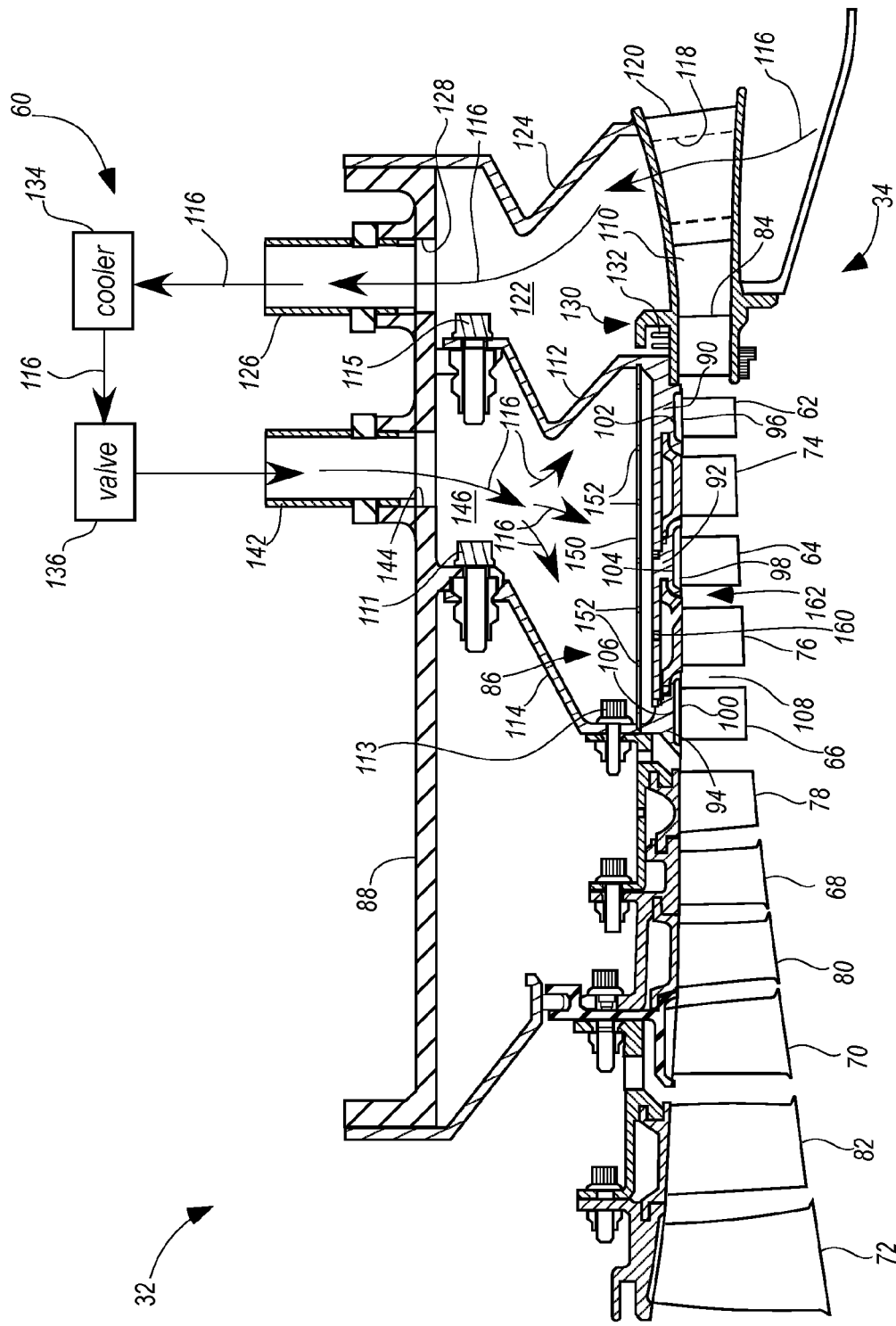
FIG. 2 illustrates some aspects of a non-limiting example of a compressor with a tip clearance control system in accordance with an embodiment of the present invention.

Referring to FIG. 2, some aspects of a non-limiting example of compressor 32 with a tip clearance control system 60 in accordance with an embodiment of the present invention is schematically depicted. Included as part of compressor rotor system 50 are a plurality of rotating compressor blades 62, 64, 66, 68, 70 and 72, each of which is disposed in a corresponding compressor blade stage having blades spaced apart circumferentially. In one form, compressor 32 is an axial compressor. In other embodiments, compressor 32 may be a centrifugal compressor or an axi-centrifugal compressor. In one form, compressor 32 includes a plurality of vanes 74, 76, 78, 80 and 82 disposed axially adjacent to compressor blades 64, 66, 68, 70 and 72. In some embodiments, compressor 32 may not include vanes. A vane 84 is disposed downstream of blade 62. In one form, vane 84 is considered a part of diffuser 34. In other embodiments, vane 84 may be considered a part of compressor 32.

Vanes 74, 76, 78, 80 and 82 are mechanically supported by an inner compressor case 86. Inner compressor case 86 is mechanically supported by an outer compressor case 88. Outer compressor case 88 is disposed around inner compressor case 86. Vane 84 is supported by diffuser 34. In one form, inner compressor case 86 is formed of a plurality of ring cases, e.g., including ring cases 90, 92 and 94. In other embodiments, inner compressor case 86 may be a single integrally formed structure, or may be any number of structures assembled and/or joined together. Blades 62, 64 and 66 have respective tips 96, 98 and 100 disposed opposite inner compressor case 86. In one form, ring cases 90, 92 and 94 include respective abradable blade tracks 102, 104 and 106 disposed opposite tips 96, 98 and 100. Other embodiments may not include abradable blade tracks, e.g., structural or non-structural materials of inner compressor case 86 may be disposed opposite blade tips 96, 98 and/or 100 without an intervening abradable material. In various embodiments, one or more coatings and/or treatments may or may not be applied to inner compressor case 86 or portions thereof opposite blade tips 96, 98 and/or 100.

Tip clearance control system 60 is configured to control a clearance between the blade tips 96, 98 and 100 and inner compressor case 86, e.g., blade tracks 102, 104 and 106. In one form, in order to control tip clearance between blade tips 96, 98 and 100 and inner compressor case 86, e.g., blade tracks 102, 104 and 106, tip clearance control system 60 impinges a fluid onto inner compressor case 86. In one form, the fluid is air. In other embodiments, other fluids may be employed in addition to or in place of air. In one form, the air is air that has been compressed by compressor 32. In other embodiments, other sources of air may be employed. In one form, the impingement fluid is cooled prior to impingement upon inner compressor case 86. In other embodiments, the fluid may not be cooled and/or may be heated or may be supplied without any heating or cooling, e.g., depending on the temperature of the fluid and other aspects of a particular application.

Blades 62, 64, 66, 68, 70 and 72 and vanes 74, 76, 78, 80 and 82 are disposed in a compressor flowpath 108 formed in part by inner compressor case 86, and by structures (not shown) disposed at root portions of blades 62, 64, 66, 68, 70 and 72 and vanes 74, 76, 78, 80 and 82. Vane 84 is disposed in a diffuser flowpath 110 located immediately downstream of compressor flowpath 108.

Extending from ring case 90 is a support structure 112. Support structure 112 extends between inner compressor case 86 and outer compressor case 88, and supports the aft end of inner compressor case 86. Support structure 112 is configured for radial flexibility for absorbing a thermal growth differential between inner compressor case 86 and outer compressor case 88, e.g., resulting from tip clearance control system 60 impinging the fluid onto inner compressor case 86. In one form, the radial flexibility is supplied by extending support structure 112 in axial directions in addition to radial directions. In other embodiments, other configurations or arrangements may be employed to provide radial flexibility. In one form, support structure 112 is attached to outer compressor case 88 via a bolted flange arrangement. In other embodiments, support structure 112 may be coupled or affixed to outer compressor case 88 via one or more other arrangements, including being integral with outer compressor case 88.

Extending from ring case 94 is a support structure 114. Support structure 114 extends between inner compressor case 86 and outer compressor case 88, and supports the forward end of inner compressor case 86. Support structure 114 is configured for radial flexibility for absorbing a thermal growth differential between inner compressor case 86 and outer compressor case 88, e.g., resulting from tip clearance control system 60 impinging the fluid onto inner compressor case 86. In one form, the radial flexibility is supplied by extending support structure 114 in an axial direction in addition to radial directions. In other embodiments, other configurations or arrangements may be employed to provide radial flexibility. In one form, support structure 114 is attached to outer compressor case 88 via a bolted flange arrangement. In other embodiments, support structure 114 may be coupled or affixed to outer compressor case 88 via one or more other arrangements, including being integral with outer compressor case 88. It should be noted that the support structure 112 includes a first connector 111 attached to the outer compressor case 88 and a second connector 113 attached to the inner compressor case 86. As shown in FIG. 2, the support structure 114 is angled between the first connector 111 and the second connector 113. Moreover, the support structure 112 includes a third connector 115 attached to the outer compressor case 88 and has as a bended knee shape connecting the outer compressor case 88 to the inner compressor case 86.

In one form, the fluid that is impinged upon inner compressor case 86 by tip clearance control system 60 is compressor 32 discharge air 116 that has been diffused by diffuser 34. In one form, the air is supplied through an opening 118 in a diffuser vane 120. Air 116 then passes through a cavity 122 defined between support structure 112 and a diffuser support structure 124. Air 116 then passes from cavity 122 into a discharge tube 126 extending from a discharge opening 128 in outer compressor case 88. In other embodiments, other arrangements for obtaining air 116 may be employed.

In one form, a joint 130 is formed at the interface between diffuser 34 and inner compressor case 86. Joint 130 is configured to permit relative radial motion between inner compressor case 86 and diffuser 34, e.g., resulting from the impingement of air 116 onto inner compressor case 86. In other embodiments, joint 130 may be formed between inner compressor case 86 and one or more other static structures. In one form, a bellows seal 132 forms a part of joint 130, which permits the relative radial motion while sealing the interface between inner compressor case 86 and diffuser 34. In other embodiments, other sealing arrangements may be employed.

In one form, air 116 is cooled by a cooler 134 prior to being impinged upon inner compressor case 86. In other embodiments, air 116 may be conditioned to any desired temperature via one or more thermal management means. In one form, cooler 134 is a heat exchanger, e.g., an air-to-air heat exchanger or an air/fuel heat exchanger. In other embodiments, other cooling schemes may be employed. In one form, cooler 134 is mounted on engine 20 and considered a part thereof. In other embodiments, cooler 134 may be mounted elsewhere.

Air 116 exiting cooler 134 is supplied to a valve 136. Valve 136 is configured to control the flow of air 116, and is disposed upstream of impingement openings that impinge air 116 onto inner compressor case 86. In one form, valve 136 is configured to modulate the flow of air 116 between a maximum flow amount and a minimum flow amount. In one form, the minimum flow amount is zero flow of air 116. In other embodiments, valve 136 may be an on/off valve.

Air 116 exiting valve 136 is passed via a supply tube 142 extending from a supply opening 144 in outer compressor case 88 into a distribution channel 146 formed between support structures 112 and 114, outer compressor case 88 and inner compressor case 86. In various embodiments, more than one of each of cooler 134 and valve 136 may be employed. For example, in some embodiments, a plurality of coolers 134 and valves 136 may be employed, e.g., with corresponding discharge tubes 126 and discharge openings 128, and supply tubes 142 and supply openings 144, respectively, spaced apart circumferentially around outer compressor case 88. In some embodiments, such an arrangement may be employed to preferentially cool different circumferential sectors of inner compressor case 86, e.g., to control the roundness of inner compressor case 86 during the operation of engine 20.

Distribution channel 146 is configured to distribute air 116 from supply opening 144 to desired locations for subsequent impingement upon inner compressor case 86. Disposed adjacent to inner compressor case 86 is a fluid impingement structure 150 having a plurality of impingement openings 152 configured to impinge air 116 onto inner compressor case 86. Tip clearance control system 60 supplies air 116 to impingement structure 150 and impingement openings 152 via supply opening 144 and distribution channel 146. In one form, impingement openings 152 are angled radially inward toward the center of rotation of the compressor blades, i.e., engine centerline 46 (FIG. 1). In other embodiments, one or more impingement openings 152 may also be angled in one or more circumferential and/or axial directions, e.g., to direct bulk flow of air 116 in one or more desired directions. After having impinged onto inner compressor case 86, air 116 is directed into compressor flowpath 108 via openings 160 and 162.

In one form, fluid impingement structure 150 is an impingement plate, i.e., a plate having impingement openings 152 formed therein. In one form, the impingement plate is disposed adjacent to inner compressor case 86, and extends circumferentially around inner compressor case 86. In other embodiments, the impingement plate may only be disposed adjacent to one or more desired parts of inner compressor case 86. In various embodiments, the impingement plate may be one or more flat plates and/or one or more curved plates. In other embodiments impingement structure may take other forms, e.g., an impingement tube.

Embodiments of the present invention include a compressor, comprising: a rotating compressor blade having a blade tip; a compressor case having a blade track disposed opposite the blade tip; and a tip clearance control system including a fluid impingement structure having a plurality of impingement openings configured to impinge a fluid onto the compressor case, wherein the tip clearance control system is configured to control a clearance between the blade tip and the blade track by impinging the fluid onto the compressor case.

In a refinement, the fluid is air compressed by the compressor.

In another refinement, the fluid is cooled prior to impingement onto the compressor case.

In yet another refinement, the compressor case is an inner compressor case, further comprising an outer compressor case disposed around the inner compressor case.

In still another refinement, the inner compressor case is mechanically supported by the outer compressor case.

In yet still another refinement, the compressor further comprises a support structure extending between the inner compressor case and the outer compressor case, wherein the support structure is configured for radial flexibility for absorbing a thermal growth differential between the inner compressor case and the outer compressor case resulting from impingement of the fluid onto the inner compressor case.

In a further refinement, the compressor further comprises an other support structure extending between the inner compressor case and the outer compressor case, wherein the fluid is supplied to the plurality of impingement openings via a supply opening in the outer compressor case; and wherein the support structure and the other support structure form a distribution channel configured to distribute the fluid from the supply opening to a desired location for subsequent impingement upon the inner compressor case.

In a yet further refinement, the fluid impingement structure is an impingement plate having the plurality of impingement openings therein; and wherein the impingement plate is disposed adjacent to at least part of the compressor case.

In a still further refinement, at least one of the impingement openings is angled radially inward toward the center of rotation of the rotating compressor blade.

In a yet still further refinement, the compressor further comprises a compressor flowpath, wherein the compressor is configured to discharge the fluid into the compressor flowpath after impingement of the fluid onto the compressor case.

Embodiments of the present invention include a gas turbine engine, comprising: a compressor including a rotating compressor blade having a blade tip, and a compressor case disposed opposite the blade tip; a fluid impingement structure having a plurality of impingement openings configured to impinge a fluid onto the compressor case; a combustor in fluid communication with the compressor; and a turbine in fluid communication with the combustor.

In a refinement, the gas turbine engine further comprises a tip clearance control system configured to control a clearance between the blade tip and the compressor case by impinging the fluid onto the compressor case, wherein the tip clearance control system is configured to supply the fluid to the fluid impingement structure.

In another refinement, the gas turbine engine further comprises a cooler configured to cool the fluid prior to impingement onto the compressor case.

In yet another refinement, the cooler is a heat exchanger.

In still another refinement, the gas turbine engine further comprises a valve configured to control a flow of the fluid, wherein the valve is fluidly disposed upstream of the impingement openings.

In yet still another refinement, the valve is configured to modulate the flow of the fluid between a maximum flow amount and a minimum flow amount.

In a further refinement, the minimum flow amount is zero flow of the fluid.

In a yet further refinement, the gas turbine engine further comprises: a static structure adjacent to the compressor case; and a joint configured to permit relative radial motion as between the compressor case and the static structure.

Embodiments of the present invention include a gas turbine engine, comprising: a compressor including a rotating compressor blade having a blade tip, and a compressor case disposed opposite the blade tip; a combustor in fluid communication with the compressor; a turbine in fluid communication with the combustor; and means for controlling a clearance between the blade tip and the compressor case by impinging a fluid onto the compressor case.

In a refinement, the means for controlling includes a fluid impingement structure having a plurality of impingement openings configured to impinge the fluid onto the compressor case.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A compressor, comprising:
   a rotating compressor blade having a blade tip;
   an outer compressor case and an inner compressor case, the inner compressor case having a blade track disposed opposite the blade tip; and
   a tip clearance control system including
      a fluid impingement structure having a plurality of impingement openings configured to impinge a fluid onto the inner compressor case;
      a valve in communication with the fluid impingement structure to control flow of the fluid received from a diffuser downstream from the compressor such that the fluid from the diffuser travels radially through an opening of the diffuser to a cooler, wherein
      the cooler is in fluid communication with the fluid impingement structure to cool the fluid, wherein the tip clearance control system is configured to control a clearance between the blade tip and the blade track by impinging the cooled fluid that has been cooled by the cooler onto the inner compressor case and wherein the valve is configured to modulate the cooled fluid between different flow amounts of the cooled fluid, and wherein the diffuser is in fluid communication with the fluid impingement structure through the cooler and the valve and a distribution channel; and
   a first support structure and a second support structure both configured for radial flexibility, wherein the first support structure and the second support structure absorb a thermal growth differential between the inner compressor case and the outer compressor case resulting from impingement of the cooled fluid onto the inner compressor case, wherein the first support structure includes a first connector attached to the outer compressor case and a second connector attached to the inner compressor case, wherein the first support structure is angled between the first connector and the second connector, wherein the second support structure includes a third connector attached to the outer compressor case, and wherein the second support structure has a bended knee shape and connects the outer compressor case to the inner compressor case.

2. The compressor of claim 1, wherein the fluid is air compressed by the compressor.

3. The compressor of claim 1, wherein the inner compressor case is mechanically supported by the outer compressor case.

4. The compressor of claim 3, wherein the first support structure connects the inner compressor case to the outer compressor case and is radially flexible such that based on the cooled fluid via the cooler, the first support structure contracts and the inner compressor case is moved radially toward the outer compressor case resulting in the clearance between the blade tip and the blade track.

5. The compressor of claim 4, wherein the second support structure extends between the inner compressor case and the outer compressor case, wherein the cooled fluid is supplied to the plurality of impingement openings via a supply opening in the outer compressor case; and wherein the first support structure and the second support structure form a distribution channel configured to distribute the cooled fluid from the supply opening for impingement upon the inner compressor case.

6. The compressor of claim 1, wherein the fluid impingement structure is an impingement plate having the plurality of impingement openings therein; and wherein the impingement plate is disposed adjacent to at least part of the inner compressor case.

7. The compressor of claim 1, wherein at least one of the impingement openings is angled radially inward toward the center of rotation of the rotating compressor blade.

8. The compressor of claim 1, further comprising a compressor flowpath, wherein the compressor is configured to discharge the cooled fluid into the compressor flowpath after impingement of the cooled fluid onto the inner compressor case.

9. A gas turbine engine, comprising:
a compressor including a rotating compressor blade having a blade tip, an outer compressor case and an inner compressor case, the inner compressor case disposed opposite the blade tip;
a fluid impingement structure having a plurality of impingement openings configured to impinge a fluid onto the inner compressor case;
a cooler in fluid communication with the fluid impingement structure to cool the fluid;
a diffuser downstream from the compressor to receive a working fluid discharge from the compressor, wherein the diffuser is in fluid communication with the fluid impingement structure and is configured to provide the fluid to the fluid impingement structure such that the fluid from the diffuser travels radially through an opening of the diffuser through the cooler and a distribution channel;
a combustor in fluid communication with the compressor through the diffuser;
a turbine in fluid communication with the combustor; and
a first support structure and a second support structure both configured for radial flexibility, wherein the first support structure and the second support structure absorb a thermal growth differential between the inner compressor case and the outer compressor case resulting from impingement of the cooled fluid that has been cooled by the cooler onto the inner compressor case, wherein the first support structure includes a first connector attached to the outer compressor case and a second connector attached to the inner compressor case, wherein the first support structure is angled between the first connector and the second connector, wherein the second support structure includes a third connector attached to the outer compressor case, and wherein the second support structure has a bended knee shape and connects the outer compressor case to the inner compressor case.

10. The gas turbine engine of claim 9, wherein the cooler is a heat exchanger.

11. The gas turbine engine of claim 9, further comprising a valve configured to control a flow of the cooled fluid, wherein the valve is fluidly disposed upstream of the plurality of impingement openings.

12. The gas turbine engine of claim 11, wherein the valve is configured to modulate the flow of the cooled fluid between a maximum flow amount and a minimum flow amount.

13. The gas turbine engine of claim 9, wherein the first support structure and the second support structure connect the inner compressor case to the outer compressor case, and are radially flexible such that based on the cooled fluid via the cooler, the first support structure and the second support structure contract and the inner compressor case is moved radially toward the outer compressor case resulting in a clearance between the blade tip and the inner compressor case.

14. A gas turbine engine, comprising:
a compressor including a rotating compressor blade having a blade tip, an outer compressor case and an inner compressor case, the inner compressor case disposed opposite the blade tip;
a diffuser downstream from the compressor receiving a working fluid discharge from the compressor, the diffuser including a pathway to provide a portion of the working fluid discharge as a fluid flow toward the compressor;
a combustor structured to receive the working fluid discharge from the compressor through the diffuser;
a turbine in fluid communication with the combustor; and
a tip clearance control system configured to provide a clearance between the blade tip and the inner compressor case by impinging the fluid flow onto the inner compressor case, the tip clearance control system including
a cooler configured to receive the fluid flow from the diffuser and cool the fluid flow to the compressor;
a fluid impingement structure having a plurality of impingement openings configured to impinge the cooled fluid flow onto the inner compressor case;
a valve configured to receive the cooled fluid flow from the cooler and provide the cooled fluid flow to the compressor, the valve being configured to modulate the cooled fluid flow between different flow amounts of the cooled fluid flow;
wherein the diffuser is in fluid communication with the inner compressor case and is configured to provide the fluid to the inner compressor case such that the fluid from the diffuser travels radially through an opening of the diffuser through the cooler and the valve and a distribution channel; and
a first support structure and a second support structure both configured for radial flexibility, wherein the first support structure and the second support structure absorb a thermal growth differential between the inner compressor case and the outer compressor case resulting from impingement of the cooled fluid onto the inner compressor case, wherein the first support structure includes a first connector attached to the outer compressor case and a second connector attached to the inner compressor case, wherein the first support structure is angled between the first connector and the second connector, wherein the second support structure includes a third connector attached to the outer compressor case, and wherein the second support structure has a bended knee shape and connects the outer compressor case to the inner compressor case.

* * * * *